(12) United States Patent
Shimizu

(10) Patent No.: US 8,764,439 B2
(45) Date of Patent: Jul. 1, 2014

(54) DEVICE FOR RECOVERING HEAT OF MOLTEN SLAG

(75) Inventor: Tadaaki Shimizu, Niigata (JP)

(73) Assignee: Niigata University, Niigata (JP)

( * ) Notice: Subject to any disclaimer, the term of this patent is extended or adjusted under 35 U.S.C. 154(b) by 416 days.

(21) Appl. No.: 13/320,080

(22) PCT Filed: May 11, 2010

(86) PCT No.: PCT/JP2010/057972
§ 371 (c)(1),
(2), (4) Date: Nov. 11, 2011

(87) PCT Pub. No.: WO2010/131658
PCT Pub. Date: Nov. 18, 2010

(65) Prior Publication Data
US 2012/0055658 A1     Mar. 8, 2012

(30) Foreign Application Priority Data

May 12, 2009   (JP) ................................ 2009-115888

(51) Int. Cl.
*C04B 5/00*    (2006.01)

(52) U.S. Cl.
USPC ................................... 432/58; 432/77; 65/19

(58) Field of Classification Search
USPC ......... 432/27, 30, 58, 61, 67, 69, 71, 77, 210, 432/211, 214; 65/19
See application file for complete search history.

(56) References Cited

U.S. PATENT DOCUMENTS

| | | | | |
|---|---|---|---|---|
| 1,445,679 A | * | 2/1923 | Gray ................................. | 432/2 |
| 2,873,554 A | * | 2/1959 | Sifrin et al. ....................... | 65/19 |
| 4,147,332 A | * | 4/1979 | Ishii et al. ....................... | 266/44 |
| 4,824,364 A | * | 4/1989 | Kobari et al. ................... | 432/30 |
| 5,255,900 A | * | 10/1993 | Schott .............................. | 266/44 |
| 6,447,288 B1 | * | 9/2002 | De Saro et al. ................. | 432/58 |
| 7,985,069 B2 | * | 7/2011 | Kurata ........................... | 432/197 |

FOREIGN PATENT DOCUMENTS

| | | |
|---|---|---|
| JP | 54038331 A | 3/1979 |
| JP | 56017954 A | 2/1981 |
| JP | 56121622 A | 9/1981 |
| JP | 05-296673 A | 11/1993 |
| JP | 05-311214 A | 11/1993 |
| JP | 11063870 A | 3/1999 |
| JP | 11-181508 A | 7/1999 |
| JP | 2001048605 A | 2/2001 |
| JP | 2007-284761 A | 11/2007 |

* cited by examiner

*Primary Examiner* — Gregory A Wilson
(74) *Attorney, Agent, or Firm* — Fox Rothschild LLP

(57) ABSTRACT

A device for recovering heat of molten slag, having a simple structure and high heat recovery efficiency. The device includes: a fluidized bed (3) formed of a fluidized bed material (32) composed of a crushed solidified slag; a slag pool (4) for feeding a molten slag to the fluidized bed; heat transfer tubes (7) for recovering heat from the fluidized bed; and a solidified slag withdrawing device (21) for recovering a solidified slag (34), such solidified slag (34) being formed in the fluidized bed as the molten slag is solidified therein. Molten slag droplets (31) are dripped into the fluidized bed (3) from the slag pool (4) and solidified in the corresponding fluidized bed. The heat released at that time is transferred to the heat transfer tubes (7) through the bed material (32). Further, heat-transfer coefficient between the heat transfer tubes and the bed material is about 10 times larger than that between the heat transfer tubes and gas, thereby reducing heat-transfer area for required heat recovery amount, thus making it possible to reduce the size of the heat recovery device.

2 Claims, 4 Drawing Sheets

US 8,764,439 B2

DEVICE FOR RECOVERING HEAT OF MOLTEN SLAG

CROSS REFERENCE TO RELATED APPLICATIONS

The present application is the U.S. National Stage of International Patent Application Ser. No. JP/2010/057972, filed May 11, 2010, which claims the benefit of Japanese Patent Application Ser. No. 2009-115888, filed May 12, 2009, both of which are hereby incorporated by reference in their entireties.

TECHNICAL FIELD

The present invention relates to a device for recovering heat from a blast furnace molten slag.

BACKGROUND ART

Conventionally, if heat transfer tubes are used to recover heat from a molten slag directly, heat cannot be recovered in a continuous manner because lump of solidified slag adheres to the heat transfer tubes. In order to address such problem, there has been proposed a method for recovering heat after once cooling as well as solidifying the slag with an air or water spray, such heat being actually recovered at a temperature not higher than a solidification temperature (e.g., patent documents 1 and 2). However, such methods can not utilize the high exergy of high-temperature slag effectively.

Further, there have also been proposed: a method for recovering heat from high-temperature gas released when spraying gas such as air on a molten slag (e.g., patent document 3); and a method for recovering heat from a water vapor generated when mixing a molten slag with cold or warm water (e.g., patent document 4). However, these methods have a fault that large heat recovery device is required because heat transfer coefficient between gas and heat transfer tubes is low.

REFERENCE

Patent document 1: Japanese Unexamined Patent Application Publication No. 2007-284761
Patent document 2: Japanese Unexamined Patent Application Publication No. Hei 5-311214
Patent document 3: Japanese Unexamined Patent Application Publication No. Hei 11-181508
Patent document 4: Japanese Unexamined Patent Application Publication No. Hei 5-296673

DISCLOSURE OF THE INVENTION

Problem to be Solved by the Invention

The objective of the present invention is to provide a device for recovering heat of molten slag, capable of solving the aforementioned problems and having a simple structure.

Means for Solving the Problem

In order to achieve the aforementioned objective, the present invention includes: a fluidized bed of bed material composed of a crushed solidified slag; a molten slag feeder to supply molten slag to the fluidized bed; heat exchangers to recover heat from the fluidized bed; and a solidified slag recovery device to withdraw solidified slag lumps formed in the fluidized bed as the molten slag is solidified therein.

Further, according to the present invention, the molten slag is dripped into the fluidized bed.

The present invention further includes: a crusher for crushing the solidified slag recovered by the solidified slag recovery device; and a circulation device for returning the solidified slag crushed by the crusher to the fluidized bed.

The present invention further includes a bed material drawing device for drawing out a part of the bed material.

Effects of the Invention

According to the aforementioned structure, the molten slag supplied to the fluidized bed is solidified in due course, and heat released at that time is transferred to heat transfer tubes through the bed material. Here, heat-transfer coefficient between the heat transfer tubes and the bed material is about 10 times larger than heat-transfer coefficient between the heat transfer tubes and gas, thereby making it possible to reduce a heat-transfer area without changing a heat recovery amount, thus achieving an excellent heat recovery efficiency and allowing the size of device to be reduced.

Further, the molten slag dripped into the fluidized bed is actually supplied thereto as molten slag droplets of a certain size, such molten slag droplets capture a part of the bed material in due course so as to form solidified slag lumps.

Furthermore, the amount of the bed material can be maintained substantially constant by returning the crushed solidified slag as the bed material to the fluidized bed through the circulation device.

Furthermore, the bed material is actually present in the fluidized bed at a high temperature and for a long period of time, thus being consequently subjected to a heat treatment. Such bed material is partially drawn out through the bed material drawing device, and may be utilized thereafter as a product such as an aggregate or the like.

BEST MODE FOR CARRYING OUT THE INVENTION

A preferable embodiment of the present invention is described in detail and with reference to the accompanying drawings. The embodiment shall not limit contents of the present invention that are described in claims. Further, not all features described hereunder are necessarily essential elements of the present invention. According to the embodiment, there is provided a new device for recovering heat of molten slag, such device being different from a conventional device and capable of recovering heat from a molten slag in an unprecedented way. The corresponding device for recovering heat of molten slag is described hereunder.

First Embodiment

Figure 1:
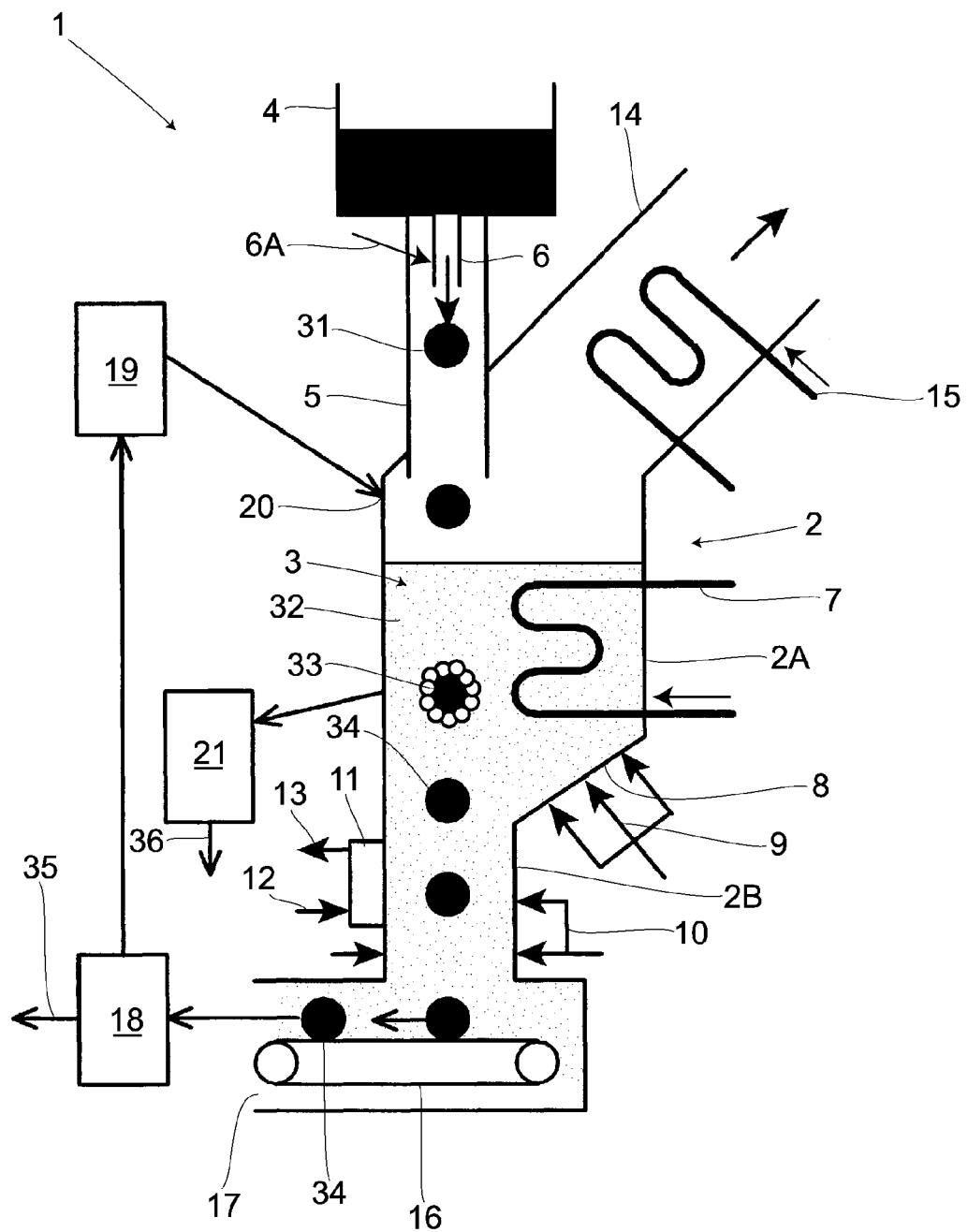
FIG. 1 is an explanatory diagram showing a first embodiment of the present invention as a whole.

A first embodiment of the present invention is described hereunder with reference to FIG. 1 through FIG. 4. As shown in FIG. 1, a device for recovering heat of molten slag 1 comprises a device main body 2. A fluidized bed 3 is provided inside the device main body 2. A slag pool 4 serving as a molten slag feeder is installed above the fluidized bed 3. A connecting channel 5 connected to the device main body 2 is installed at the bottom of the slag pool 4. A slag drip nozzle 6 connected to the bottom of the slag pool 4 is provided inside the connecting channel 5. Such slag drip nozzle 6 is provided with a blowing nozzle 6A through which a high-speed air or nitrogen is supplied.

With regard to the device main body 2, heat transfer tubes 7 are in the upper part of the fluidized bed 3. A gas distributor plate 8 is provided below the heat transfer tubes 7, such gas distributor plate 8 being formed by slanting a side plate 2A of the device main body 2. The gas distributor plate 8 is equipped with gas nozzles 9 for supplying fluidization gas to the fluidized bed 3. Further, a side plate 2B continuously connected to a lower portion of the gas distributor plate 8, is equipped with aeration nozzles 10 for supplying the fluidization gas to the fluidized bed 3. Such gas nozzles 9 and aeration nozzles 10 serve as fluidization gas feeders. Here, with regard to the fluidized bed 3, a section below the gas distributor plate 8 and surrounded by the side plate B, has a cross-section smaller than that of the upper section. The superficial gas velocity in the section surrounded by the side plate 2B is greater than the superficial gas velocity above the gas distributor plate 8.

A heat exchanger 11 is installed on the side plate 2B. Such heat exchanger 11 is further connected to a cooling water feeder 12, thus making it possible to cool the solidified slag and bed material flowing downward inside the section surrounded by the side plate 2B. The cooling water that is thus heated in the heat exchanger 11 by the heat of the solidified slag and bed material is then recovered as either steam or warm water through a recovery passage 13 toward the outside.

An exhaust gas duct 14 is further provided at the top of the device main body 2. Such exhaust gas duct 14 is located above the fluidized bed 3 and has heat transfer tubes 15 thereinside. Here, the heat transfer tubes 7 serving as heat exchangers are actually in contact with the bed material 32 in the fluidized bed 3, whereas the heat transfer tubes 15 are in contact with the exhaust gas in the exhaust gas duct 14, thereby allowing heat to be recovered from the bed material and the exhaust gas, respectively. Further, a cooling water or steam serving as a heat medium is supplied to the heat transfer tubes 7, 15, and is then recovered as superheated steam, saturated steam or warm water.

A solidified slag withdrawing device 16 such as a conveyer or the like is installed at the lower part of the fluidized bed 3, particularly on a bottom section in the device main body 2. The solidified slag withdrawing device 16 discharges the solidified slag containing the bed material from a discharge outlet 17 toward the outside. Further, a crushing device 18 is provided serving as a crusher for crushing the solidified slag discharged from the discharge outlet 17. The slag crushed by the crushing device 18 is then partially returned to the device main body 2 through a bed material supply outlet 20 by means of a circulation device 19. Here, thus returned particles that consist of the crushed slag form the bed material. The bed material supply outlet 20 is located above the upper surface of the fluidized bed 3. Further, the crushed slag that is not returned to the fluidized bed 3 is discharged to outside as a product 35.

Furthermore, a bed material drawing device 21 is connected to a section below the upper surface of the fluidized bed 3. Such bed material drawing device 21 serves to partially draw out the bed material 32. The bed material thus drawn out becomes a product 36.

An operation of the recovery device 1 is described hereunder. Molten slag droplets 31 are dripped into the fluidized bed 3 from the slag pool 4 installed above the fluidized bed 3. Here, the molten slag droplets 31 are actually continuously dripped at a certain interval. The fluidized bed 3 is composed of the bed material 32, such bed material 32 being further composed of the grains of the crushed slag with particle diameters of 0.1 mm to 3 mm, and fluidized by air or nitrogen at a gas velocity 2 to 20 times higher than the minimum fluidization velocity. The gas used to fluidize the bed material 32 is supplied from the gas nozzles 9 and the aeration nozzles 10. The temperature inside the fluidized bed 3 is maintained at a value not higher than a slag melting point, preferably at 700 to 1000° C. The slag dripped form solidified lumps 33 by partially capturing the bed material 32 therearound. The solidified lumps 33 thus formed are eventually turned into a completely cooled and solidified slag 34 after being deprived of heat by the bed material 32 therearound. The heat transferred to the bed material 32 is then further transferred to the cooling water or steam supplied to the heat transfer tubes 7 immersed in the fluidized bed 3, the heat transfer tubes 15 and the heat exchanger 11, followed by being recovered in the form of superheated steam, saturated steam or warm water.

The solidified slag 34 sinks in the fluidized bed 3 due to the fact that it is heavier than the bed material 32 therearound. The solidified slag 34 is then withdrawn out of the fluidized bed 3 through the discharge outlet 17 by means of the solidified slag withdrawing device 16 installed at the bottom, after being cooled by the heat exchanger 11 installed on the side plate 2B and by the gas from the aeration nozzles 10. Here, since the solidified slag 34 adheres the bed material 32, the amount of the bed material 32 decreases as the solidified slag 34 is withdrawn out. However, the amount of the bed material 32 can actually be maintained substantially constant by feeding bed material formed by crushing the solidified slag 34 by use of the crushing device 18 and then by recycling the bed material to the fluidized bed 3 through the circulation device 19. A portion of the crushed slag particles from the crushing device 18 that is not utilized becomes the product 35. Further, the bed material 32 inside the device main body 2 is actually present in the fluidized bed 3 at a high temperature and for a long period of time, thus being consequently subjected to a heat treatment. Furthermore, the bed material 32 can be also partially withdrawn out through the bed material drawing device 21, and utilized as the product 36 thereafter. Particularly, the high-speed air or nitrogen is supplied to the nozzle 6 through the blowing aperture 6A, thus making it possible to adjust the size of the droplets, i.e., particle diameter of the droplets being dripped into the fluidized bed 3 from the slag pool 4.

Since the bed material 32 enables heat transfer in the fluidized bed 3, heat of the molten slag can be transferred to the heat transfer tubes 7 even when the molten slag is not directly adhered to the heat transfer tubes 7. Here, a heat-transfer coefficient between the heat transfer tubes 7 and the fluidized bed 3 is about 10 times larger than a heat-transfer coefficient between the heat transfer tubes 7 and the gas (gaseous body), thereby reducing a heat-transfer area by one order of magnitude for the same heat transfer rate, thus making it possible to reduce the size of heat recovery device. Further, since the solidified slag lumps 34 sink in the fluidized bed 3, it is possible to selectively as well as continuously withdraw the corresponding solidified slag 34 out. Namely, the heat of solidification released with solidification of the molten slag can be transferred to the heat transfer tubes 7 through the bed material 32 composed of the fluidized grains. According to the present embodiment, steam of a temperature as high as possible (for example, not lower than 600° C., approximately) can be recovered, thus allowing the high energy of high-temperature blast furnace molten slag to be effectively utilized. Further, since no molten slag adheres to the heat transfer tubes 7, continuous and stable operation can be performed. Furthermore, since the temperature inside the fluidized bed 3 can be maintained as high as 800 to 1000° C., the solidified slag can simultaneously be subjected to a heat treatment.

According to the present embodiment, air is employed to fluidize the fluidized bed 3 composed of the bed material 32 formed by crushing the solidified slag 34. The molten slag is then dripped into the fluidized bed 3 thus configured, followed by being solidified while adhering a part of bed material therearound in the fluidized bed 3. The heat released during solidification is transferred to the heat transfer tubes 7 in the fluidized bed 3 through the bed material therein. In this way, the heat is recovered by the heat transfer tubes 7. Coarse grains of the solidified slag then sink in the bed and finally reach the bottom section so as to be cooled and drawn out therefrom. Part of the solidified slag thus cooled and withdrawn out is then crushed so as to form the bed material 32 of the fluidized bed 3, whereas the rest of the solidified slag is effectively utilized as the product 35 such as aggregates or the like.

EXPERIMENTAL EXAMPLE

1. Procedures of the Experiment

Figure 2:
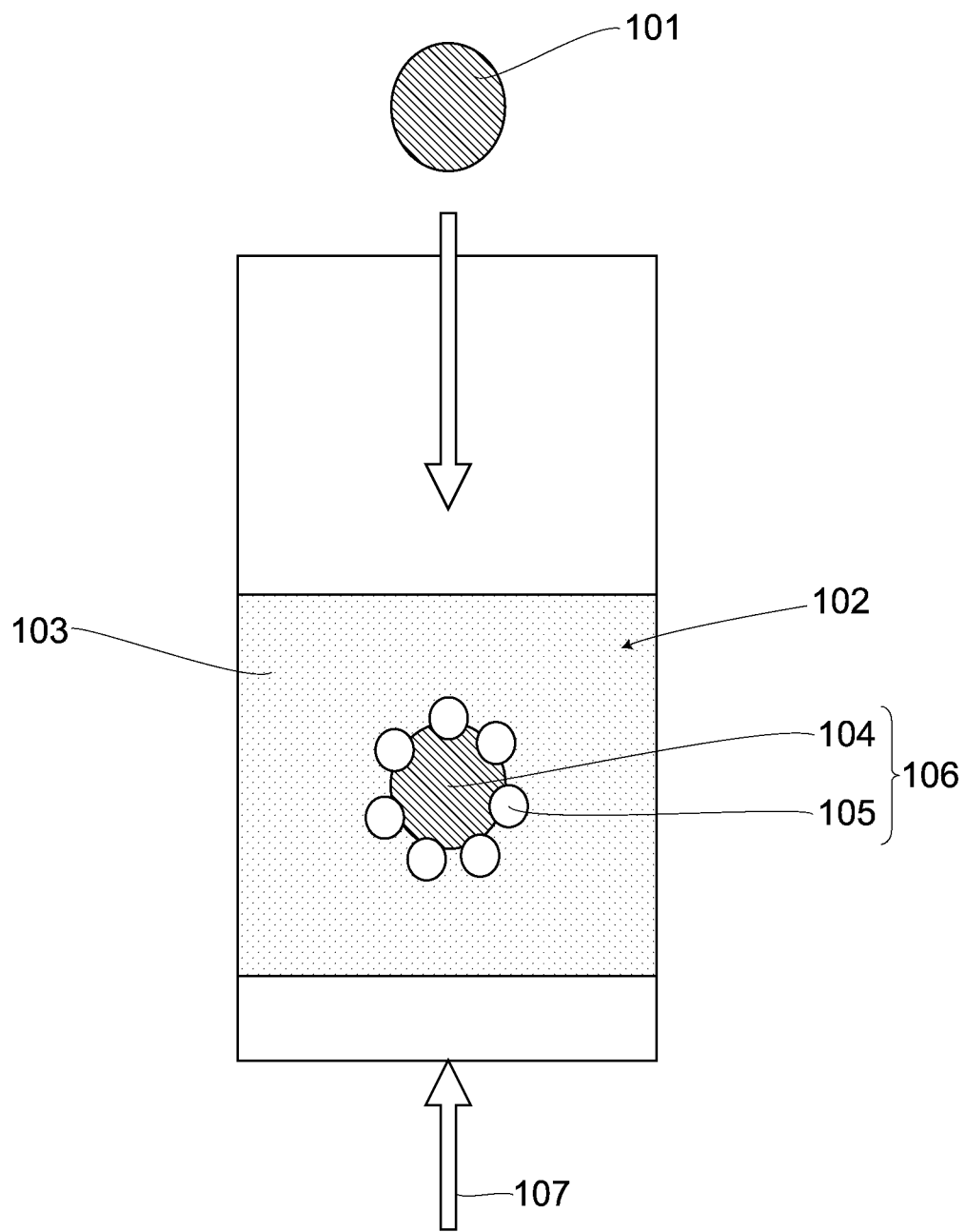
FIG. 2 is an explanatory diagram showing a device used in an experiment regarding the first embodiment of the present invention.

In order to simulate a method of the present invention for recovering heat from a molten slag using a fluidized bed, a simulated slag (wax 101) was dripped into a fluidized bed 102. Here, experiments were conducted to evaluate whether or not heat released when the molten wax 101 was solidified could be transferred to bed materials therearound according to the present theory, and to what extent the simulated slag (wax 101) undergoing solidification would capture the grains therearound. FIG. 2 is a schematic view of a device used in the experiment.

A device main body used in the experiment was made of acrylic and had an inner diameter of 54 mm. Further, there was employed the fluidized bed 102 of a height of 300 mm. Polystyrene foam heat insulator was placed at the bottom section of the device, and the device side wall had a double-layer pipe structure for the sake of heat insulation. The device was loaded with 300 g of quartz sand particles (QS) having a particle diameter of 0.15 mm as a bed material 103. In order to fluidize bed material, nitrogen was supplied as fluidization gas 107 at a feed rate of 13.55 l/min which was five times larger than the minimum fluidization velocity.

1-hexadecanol (cetanol) was employed as the molten wax (Wax) 101 simulating a molten slag. The molten wax 101 had a melting point of 49° C. and a density of 800 kg/m$^3$. An automatic dripping device was then used to feed the molten wax 101 heated at 80° C. by drops into the fluidized bed 102, at a rate of one droplet per 1.5 seconds. Diameters of the droplets were about 4 to 5 mm. The mass feed rate of wax was measured in advance under conditions identical to those described above.

The dripping of the molten wax 101 was stopped while the fluidization was stable (up to 300 seconds), followed by recovering 102 a mixture of solidified lumps 106 and the bed material 103 from the fluidized bed, such solidified lumps 106 being composed of a solidified wax 104 and quartz sand particles 105. Subsequently, a sieve of 2.50 mm opening size was used to separate the solidified lumps 106 from the bed material 103. With regard to the solidified lumps 106, a hot water was further used to melt the wax therein, and the molten wax 101 was separated from the quartz sand 105 by sedimentation of the quartz sand and floatation of molten wax based on differences in densities of the molten wax 101, the quartz sand grains 105 and water. The wax and the quartz sand grains were then dried, and weights thereof were measured respectively thereafter, thus the amount of the quartz sand 105 captured by the wax 104 was determined.

2. Results of the Experiment

Figure 3:
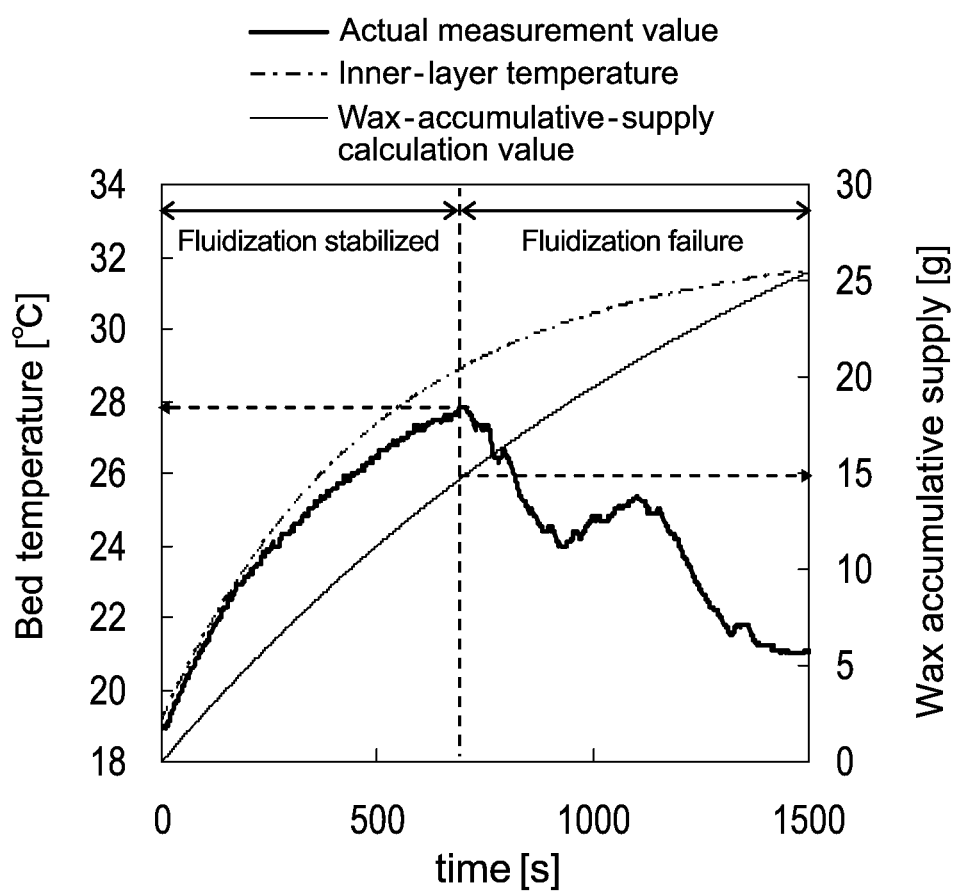
FIG. 3 is a graph showing a correlation between an actual temperature of a fluidized bed and a theoretical temperature thereof, such fluidized bed being used in the experiment regarding the first embodiment of the present invention.

FIG. 3 shows a result of comparison between measured change in temperature in the fluidized bed 102 with theoretical prediction of temperature change after starting the feed of the simulated slag (wax 101). The theoretical temperature change was predicted based on an assumption that heat released during solidification of the simulated slag (wax 101) was once completely transferred to the quartz sand particles and the fluidization gas, and an assumption that a part of heat transferred to the quartz sand particles and the fluidization gas was lost through the wall of the device containing the fluidized bed. The experimental result of the change in temperature shows that stable fluidization was attained for 700 seconds after starting feeding the simulated slag (wax 101), and the temperature change with time during this period was substantially identical to that of the theoretical prediction. This agreement indicates that the present invention enables heat recovery through the fluidized bed, as long as an appropriate fluidization is maintained. In contrast, poor fluidization occurred after 700 seconds had passed, due to accumulation of the solidified lumps 106 in the device. Further, the temperature rise did not follow a theoretical pattern after 700 seconds had passed. However, accumulated solidified slag lumps can actually be drawn out using an appropriate device such as the solidified slag withdrawing device 16 described in the first embodiment, thus the poor fluidization due to the accumulation of the solidified lumps can be avoided.

Figure 4:
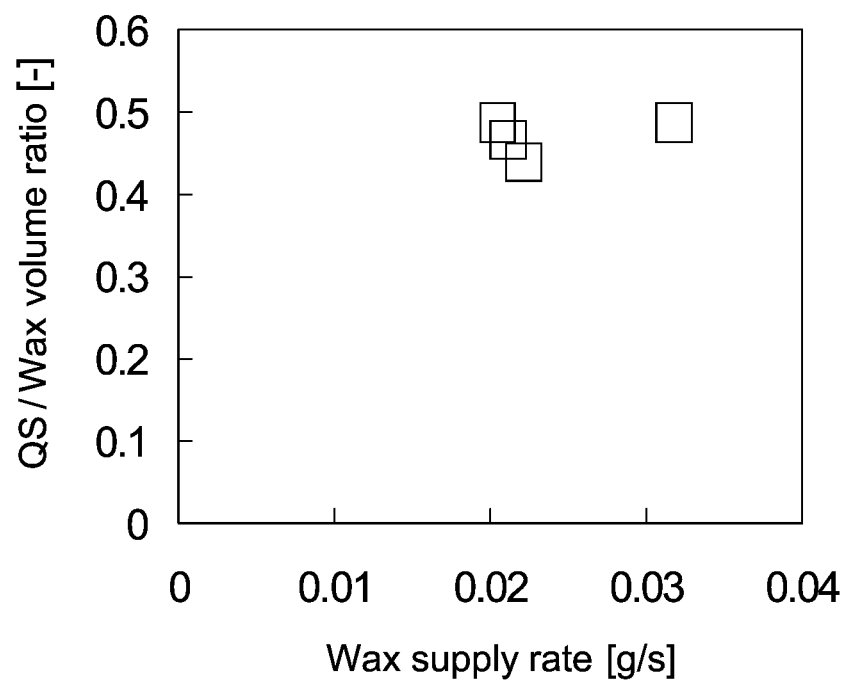
FIG. 4 is a graph showing relationship between feed rate of simulated slag and captured amount of quartz sand particles, in the experiment regarding the first embodiment of the present invention.

FIG. 4 shows the volume of the quartz sand particles captured by the simulated slag (wax 101). The solidified lumps 106 accumulated in the fluidized were removed at 300 seconds after starting supplying the simulated slag (wax 101). Then, the wax 101 in the solidified lumps 106 was separated from the quartz sand particles, and the weights thereof were measured respectively thereafter. Here, the volume of the quartz sand particles captured by the simulated slag (wax 101) was calculated based on the weights thus measured and the densities of the simulated slag (wax 101) and the quartz sand particles. It was found that the quartz sand particles had been taken in at a volume ratio of "sand: simulated slag (wax 101)=0.4-0.5:1, independent on the feed rate of the simulated slag (wax 101). Such data enable us to predict the amount of the solidified lumps that should be crushed then recycled to the bed.

As described above, the device of the present embodiment includes: the fluidized bed 3 formed of the fluidized bed material 32 composed of the crushed solidified slag; the slag pool 4 serving as a molten slag feeder supplying the molten slag to the fluidized bed 3; the heat transfer tubes 7 serving as a heat exchanger for recovering heat from the fluidized bed 3; and the solidified slag withdrawing device serving as a solidified slag recovery device for recovering the solidified slag 34, such solidified slag 34 being formed as the molten slag is solidified in the fluidized bed 3. Particularly, the molten slag supplied to the fluidized bed 3 is solidified in due course, and the heat released during solidification is transferred to the heat transfer tubes 7 through the bed material 32. Here, the heat-transfer coefficient between the heat transfer tubes 7 and the fluidized bed 32 is about 10 times larger than the heat-transfer coefficient between the heat transfer tubes and the gas, thereby making it possible to reduce the heat-transfer area with the same heat recovery amount, thus achieving an excellent heat recovery efficiency and allowing the size of device to be reduced.

Further, according to the present embodiment, the molten slag is dripped into the fluidized bed 3 in a form of molten slag droplets 31, such molten slag droplets 31 being formed into pieces of a certain size and capturing a part of the bed material 32 finally form the completely solidified slag 34.

The device of the present embodiment further includes: the crushing device 18 serving as a crusher crushing the solidified slag recovered by the solidified slag withdrawing device 16 serving as a solidified slag recovery device; and the circulation device 19 for returning the crushed solidified slag to the fluidized bed 3. In this way, the bed material 32 can be returned to the fluidized bed 3 through the circulation device 19, thus allowing the amount of the bed material 32 to be maintained substantially constant.

The device of the present embodiment further includes the bed material withdrawing device 21 for drawing out a part of the bed material 32. Here, part of the bed material 32 is actually present in the fluidized bed 3 at a high temperature and for a long period of time, thus being consequently subjected to the heat treatment. The bed material 32 thus heated is partially drawn out through the bed material drawing device 21, and utilized thereafter as the product 36 such as an aggregate or the like.

Furthermore, according to the present embodiment, air or nitrogen gas serving as the fluidization gas is supplied to the bed material 32 composed of the crushed solidified slag, thus fluidizing the bed material 32.

The present invention shall not be limited by the aforementioned embodiment. As a matter of fact, various modified embodiments are possible. For example, there can be used various kinds of fluidization gases other than those used in the aforementioned embodiment.

Description of the Symbols 1 device for recovering heat of molten slag
2 fluidized bed main body
2A fluidized bed main body side plate
2B fluidized bed bottom grain cooling/drawing side plate
3 fluidized bed
4 slag pool (molten slag feeder)
5 connecting channel
6 slag drip nozzle
6A gas blowing nozzle for slag drip nozzle
7 heat transfer tubes (heat exchange) immersed in the fluidized bed
8 gas distributor plate
9 gas nozzle (fluidization gas feeder)
10 aeration nozzle (fluidization gas feeder)
11 heat exchanger for cooling solids to be withdrawn
12 cooling water feeder
13 steam or warm water recovery passage
14 exhaust gas duct
15 inner-duct heat transfer tubes (heat exchanger)
16 solidified slag withdrawing device (solidified slag recovery device)
17 solidified slag discharge outlet
18 crushing device (crusher)
19 circulation device
20 bed material supply outlet
21 bed material drawing device
31 molten slag droplets
32 bed material
33 half-solidified slag capturing a part of bed material during solidification (solidified lumps)
34 solidified slag
35 product (crushed solidified slag)
101 simulated slag (wax)
102 fluidized bed
103 bed material
104 solidified simulated slag (solidified wax)
105 bed material captured by simulated slag
106 solidified lumps (solidified simulated slag with captured bed material)
107 fluidization gas

The invention claimed is:

1. A device for recovering heat of molten slag, comprising:
a fluidized bed provided in a device main body and formed of fluidized bed material composed of crushed solidified slag;
a molten slag feeder for supplying molten slag to said fluidized bed;
heat exchangers for recovering heat from said fluidized bed;
a solidified slag recovery device for recovering solidified slag, said solidified slag being formed in said fluidized bed as said molten slag is solidified;
a crusher for crushing said solidified slag recovered by said solidified slag recovery device;
a circulation device for returning to said bed material grains of said solidified slag crushed by said crusher;
a bed material drawing device for partially drawing out said bed material; and
an exhaust gas duct disposed on upper section of said device main body, particularly above said fluidized bed, wherein
said molten slag supplier allows molten slag droplets to be dripped into said fluidized bed from a slag drip nozzle disposed on a slag pool provided above said fluidized bed,
said circulation device returns said crushed grains of said solidified slag to said device main body from a bed material supply outlet provided above said fluidized bed, and
said heat exchangers include:
heat transfer tubes which are disposed in upper portion of said fluidized bed and in contact with said bed material in said fluidized bed;
a heat exchanger disposed on a slide plate of said device main body; and
heat transfer tubes which are disposed in said exhaust gas duct and in contact with exhaust gas in said exhaust gas duct.

2. The device for recovering heat of molten slag according to claim 1, wherein said bed material composed of said crushed solidified slag is supplied with fluidization gas, thus fluidizing said bed material.

\* \* \* \* \*